US008413145B2

(12) United States Patent
Chou et al.

(10) Patent No.: US 8,413,145 B2
(45) Date of Patent: Apr. 2, 2013

(54) METHOD AND APPARATUS FOR EFFICIENT MEMORY REPLICATION FOR HIGH AVAILABILITY (HA) PROTECTION OF A VIRTUAL MACHINE (VM)

(75) Inventors: Wu Chou, Basking Ridge, NJ (US); Weiping Guo, Hillsborough, NJ (US); Feng Liu, Hillsborough, NJ (US); Zhi Qiang Zhao, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 275 days.

(21) Appl. No.: 12/895,230

(22) Filed: Sep. 30, 2010

(65) Prior Publication Data

US 2012/0084782 A1    Apr. 5, 2012

(51) Int. Cl.
*G06F 9/455* (2006.01)

(52) U.S. Cl. ............................................ 718/1; 711/112

(58) Field of Classification Search ........................ None
See application file for complete search history.

(56) References Cited

U.S. PATENT DOCUMENTS

| 7,246,256 | B2 | 7/2007 | de la Cruz et al. | |
| 2003/0161302 | A1* | 8/2003 | Zimmermann et al. | 370/363 |
| 2006/0253649 | A1* | 11/2006 | Wezelenburg | 711/110 |
| 2012/0011401 | A1* | 1/2012 | Ranganathan et al. | 714/19 |

OTHER PUBLICATIONS

Brendan Cully, Remus: High Availability via Asynchronous Virtual Machine Replication, NSDI '08: 5th USENIX Symposium on Networked Systems Design USENIX Association and Implementation.*
Cully et al., "Remus: High Availability via Asynchronous Virtual Machine Replication," 5th USENIX Symposium on Networked Systems Design and Implementation (NSDI '08), Jun. 2008, pp. 1-14.
Background of the Invention for the above-captioned application filed Sep. 30, 2010 (previously provided).
U.S. Appl. No. 13/108,424, filed May 16, 2011, Chou et al.
U.S. Appl. No. 12/711,968, filed Feb. 24, 2010, Chou.

* cited by examiner

*Primary Examiner* — Emerson Puente
*Assistant Examiner* — Dong Kim
(74) *Attorney, Agent, or Firm* — Sheridan Ross P.C.

(57) ABSTRACT

High availability (HA) protection is provided for an executing virtual machine. At a checkpoint in the HA process, the active server suspends the virtual machine; and the active server copies dirty memory pages to a buffer. During the suspension of the virtual machine on the active host server, dirty memory pages are copied to a ring buffer. A copy process copies the dirty pages to a first location in the buffer. At a predetermined benchmark or threshold, a transmission process can begin. The transmission process can read data out of the buffer at a second location to send to the standby host. Both the copy and transmission processes can operate substantially simultaneously on the ring buffer. As such, the ring buffer cannot overflow because the transmission process continues to empty the ring buffer as the copy process continues. This arrangement allows for smaller buffers and prevents buffer overflows.

19 Claims, 6 Drawing Sheets

METHOD AND APPARATUS FOR EFFICIENT MEMORY REPLICATION FOR HIGH AVAILABILITY (HA) PROTECTION OF A VIRTUAL MACHINE (VM)

CROSS REFERENCE TO RELATED APPLICATIONS

U.S. patent application Ser. No. 12/711,968, entitled "Method and Apparatus for High Availability (HA) Protection of a Running Virtual Machine (VM)," to Chou et al., filed Feb. 24, 2010, is incorporated by reference in its entirety for all that it teaches

BACKGROUND

Many computing systems are migrating to a "cloud computing" environment. Cloud computing is the use of a virtualized resource (referred to herein as a "virtual machine") as a service over a network. The virtual machine can execute over a general technology infrastructure in the cloud. In other words, the virtual machine can operate on many different types of hardware computing systems or over several computing systems. The hardware computing systems are generally commodity type systems that are both inexpensive and easy to operate. Cloud computing often provides common business applications online that are accessed over the network, while the software and data are stored on servers. Cloud computing generally precludes the need to use specially designed hardware.

Unfortunately, the commodity type hardware can be prone to faults or breakdowns. As a result, the virtual machine may also be prone to faults from losing the underlying hardware platform. Some virtual machines execute applications that are required to be highly available. In other words, the applications cannot be prone to frequent faults. There have been attempts to create systems or processes to make virtual machines highly available. However, these prior approaches generally suffer from problems.

To copy data stored in memory used by the VM, the protected VM is generally suspended and copies of changed memories (dirty pages) are copied to a local memory buffer. Once the copying process is completed, the protected VM resumes running while the buffer starts transmitting the dirty pages in its local memory buffer to a standby host for system replication. Generally, the local memory buffer is pre-allocated with a fixed capacity in random access memory.

If the local memory buffer cannot hold all the dirty pages of the protected VM, prior systems generally send all the data in the local memory buffer to the standby host (empty/flush the buffer). Then, once the local memory buffer is empty again, the memory replication module copies the remaining dirty pages of the protected VM to the local memory buffer. This process is repeated until all dirty pages of the protected VM are copied to the buffer, and the protected VM resumes running once this copying process is completed. Thus, the VM is suspended at least through a complete copy process, the send process, and then the rest of the copy process.

This overflow of the buffer makes the memory replication very inefficient. The cost of handling a local memory buffer overflow is large because the protected VM has to be suspended and wait until the copy and flush process completes. Further, the memory copying process is also suspended until the local memory buffer empties the local memory buffer. The local memory buffer flushing process adds the additional network transmission overhead to the suspension time of the protected VM which can be large based on the network. In addition, the network transmission overhead is proportional to the size of the local memory buffer being used as that determines the amount of data to transmit before allowing the copying process to continue and before the protected VM is allowed to resume running.

In other systems, the local buffer is very large to ensure that the buffer is never overflowed. Unfortunately, the largest amount of dirty pages to copy for the protected VM often occur in peaks, and the amount of dirty pages can vary drastically beyond an order of magnitude depending on the running state of the protected VM. Thus, to protect against overflow, the buffer is made extremely large, which is also inefficient and costly. The large buffer can create a large memory footprint and take away a significant portion of the system resources. Further, the large buffer can incur a huge resource overhead and cannot extend to support multiple protected VMs.

SUMMARY

It is with respect to the above issues and other problems that the embodiments presented herein were contemplated. The system includes an active host server and a standby host server that can execute a virtual machine. Upon the suspension of the virtual machine on the active host server, dirty memory pages are copied to a ring buffer. A copy process copies the dirty pages to a first location in the buffer. At a predetermined benchmark or threshold, a transmission process can begin. The transmission process can read data out of the buffer at a second location to send to the standby host. Both the copy and transmission processes can operate simultaneously on the ring buffer. As such, the ring buffer cannot overflow because the transmission process continues to empty the ring buffer as the copy process continues. This arrangement allows for smaller buffers and prevents buffer overflows.

The embodiments introduce an efficient checkpoint algorithm to prevent buffer overflow and eliminate extra VM suspension time. The embodiments make the data transmission phase independent of the status of the protected VM, whether the VM is suspended or running The trigger of the data transmission phase depends only on the data availability in the local memory buffer. Once there is enough data in the local memory buffer, the sending task can be triggered. As a result, data transmission occurs during two different phases, while the VM is suspended and after VM resumed. By engaging the transmission process early, the embodiments eliminate the extra VM suspension time that occurs in prior art systems.

To achieve the goal mentioned above, instead of sequential processing of copying then empty the local memory buffer, the copying of dirty memory pages is separated into two separate parallel and coordinated threads, a copy thread and a send thread. The copy thread is responsible for copying dirty pages into the local memory buffer. On the other hand, the send thread reads dirty pages from the local memory buffer and transmits the memory pages to the standby host. The copy thread can be engaged immediately, as soon as the VM is suspended, and copies dirty pages to the local buffer as fast as possible. The functioning of the copy thread can guarantee the VM can be resumed without any delay.

A notification threshold may be employed to control when the send thread should engage. The copy thread may signal the send thread when the amount of data in the buffer is more than the notification threshold. In embodiments, the threshold may be defined as the amount of the buffer being used, e.g., 50% of the local memory buffer capacity. By setting this threshold, the embodiments achieve two goals: (1) there is at least 50% of remaining buffer capacity for the copy thread to continue copying (therefore, the copy thread will not be blocked); and (2) the send thread has enough data to send (50% of the buffer capacity) (the send thread will not be blocked waiting for data).

In alternative embodiments, the send thread may be rate controlled. The send thread can be restricted from reading all the available data in one attempt. If the send thread is too aggressive, the send thread can potentially flood the Transmission Control Protocol (TCP) channel, which can affect other applications. In addition, once the sender has no data to read, the send thread can sleep and wait for another notification signal from the copy thread. In embodiments, the pausing of the send thread requires extra synchronization between the copy and send threads and should not happen often. To optimize the efficiency, the reading rate of the send thread is configurable can be matched to ensure similar movement of data, for example 4 MB per read.

In the case that the stored dirty pages over the notification threshold, only two signals are needed. The first one is triggered when the notification threshold is reached; and the second one is sent after the copy is done. Since the second signal is sent after the VM is resumed, the second signal has no impact on suspension time. The above embodiments realize a unique ring buffer where the copying thread copies the dirty pages to the buffer while the send thread simultaneously chases the send thread and sends the dirty pages to the standby host. This ring buffer opens up new space in the ring buffer to reuse by the copy thread, until the send thread transmits the last dirty page in the buffer.

The terms "software thread" or "thread", as used herein, can represent a unit of processing that can be scheduled by an operating system. A thread may consist of one or more lines of code that are executed by a processor to complete an action or set of actions.

The terms "section" of "portion", as used herein, can represent a division of an object, structure, or thing. In terms of a ring buffer, a section or portion can be any division of the total capacity of the ring buffer whether delineated by hardware structure (e.g., a memory cell) or by a logical division.

The term "ring buffer", as used herein, can mean a type of memory or storage system. A ring buffer can allow for sections of the ring buffer to be reused to store data. For example, a first set of data may be stored in a first section of the ring buffer. After that data is removed from the first set of data during the copying of data from a main memory to the ring buffer, second data can be stored in the first section of the ring buffer. Thus, the ring buffer is "circular", in that, the sections of the ring buffer can be reused during a session of copying data to the ring buffer.

The term "threshold", as used herein, can represent a limit. The threshold can be associated with data availability of a component, for example, the ring buffer. The threshold may be represented by a portion of a capacity of the component, e.g., 50% of the total capacity of the ring buffer.

The term "capacity", as used herein, can represent a total amount of available memory space in a ring buffer.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "daemon" is a computer program that runs in the background, rather than under the direct control of a user; which are usually initiated as background processes.

The term "filesystem" is a method for storing and organizing computer files and the data they contain to make it easy to find and access them. File systems may use a computer readable medium and involve maintaining the physical location of the files.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

The term "page" refers to a section of memory that is accessible at one time.

The term "virtual machine" includes system virtual machines (or hardware virtual machines), which provide a complete system platform to support the execution of a complete operating system, and process virtual machines (or process virtual machines), which run a single program that supports a single process. System virtual machines allow the sharing of the underlying physical machine resources between differing virtual machines, each running on its own operating system. Process virtual machines run as a normal application inside on operating system, are created when the supported process is started, and destroyed when the process exists. A common characteristic of a virtual machine is that the software running inside is limited to the resources and abstractions provided by the virtual machine.

Hereinafter, "in communication" shall mean any electrical connection, whether wireless or wired, that allows two or more systems, components, modules, devices, etc. to exchange data, signals, or other information using any protocol or format.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. Various changes may be made in the function and arrangement of elements without departing from the spirit and scope of the invention as set forth in the appended claims.

Figure 1A:
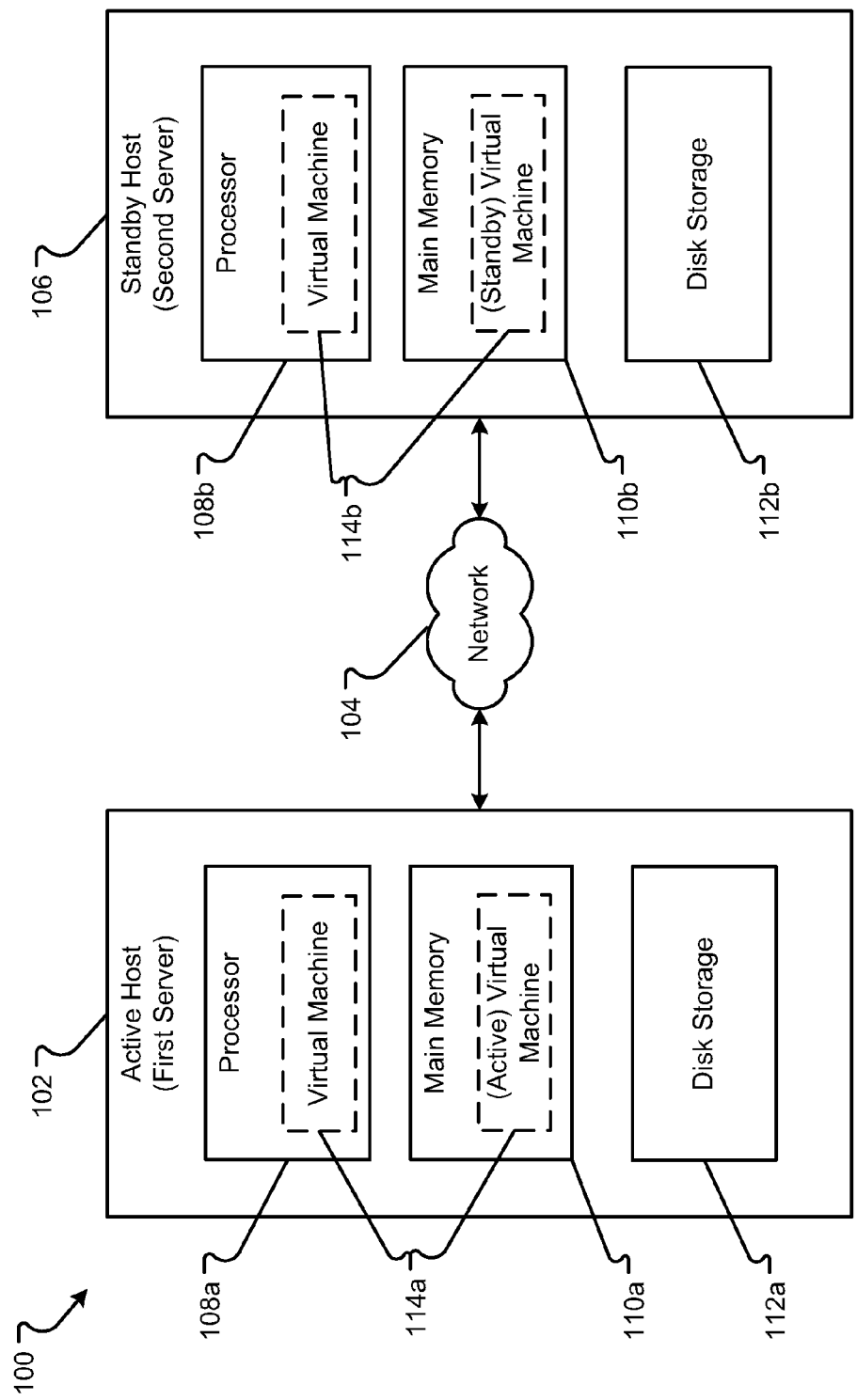
FIGS. 1A and 1B are block diagrams of an embodiment of a system for providing HA protection to a VM.
Figure 1B:
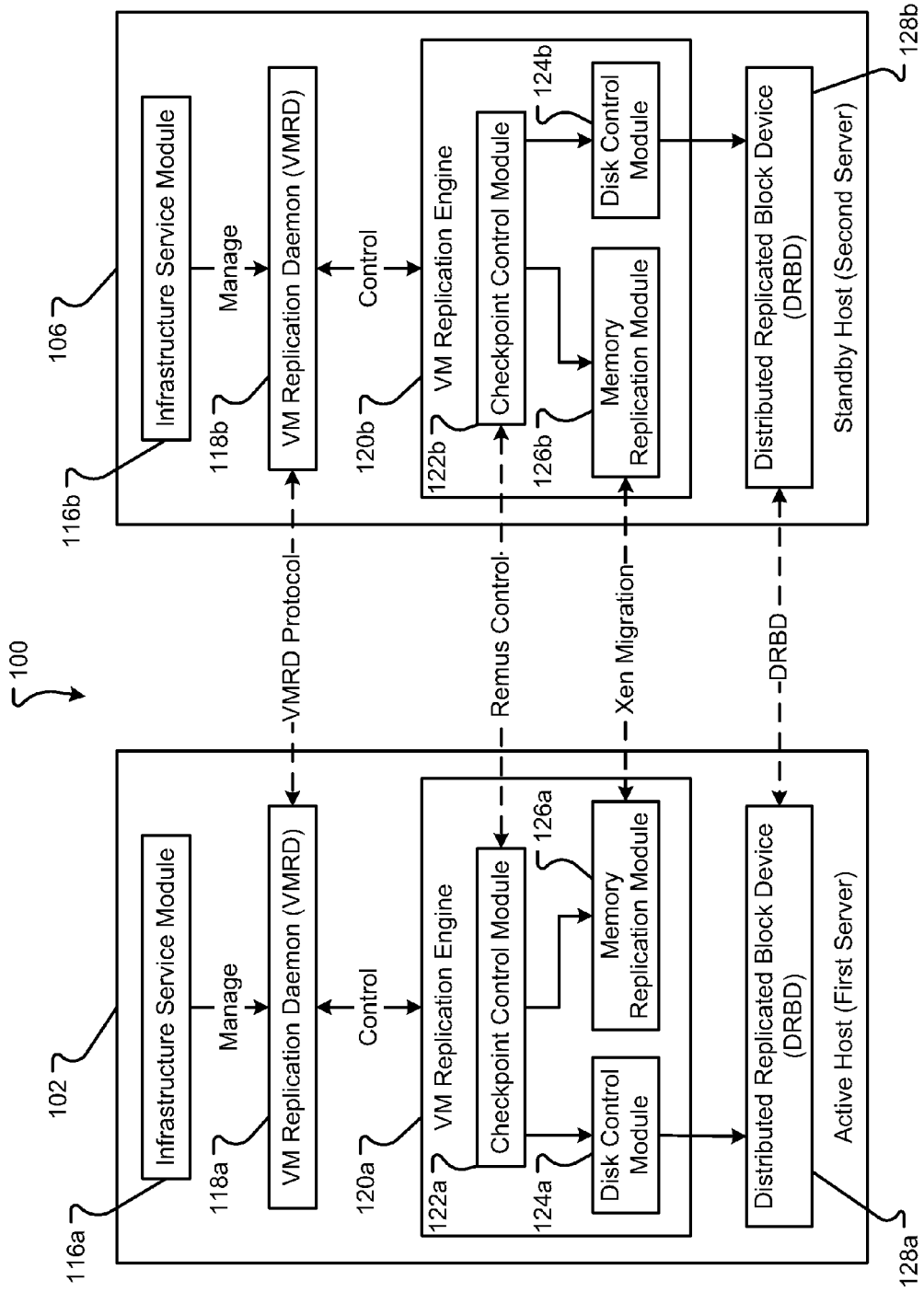

An embodiment of an environment generally operable to execute the system 100 is shown in FIGS. 1A and 1B. The system 100 generally includes an active host (first server) 102 and a standby host (second server) 106. The active host 102 and the standby host 106 can include computers or computing systems, such as a server, and can be referred to simply as "servers." The active host 102 and the standby host 106 are generally computing systems as described in conjunction with FIGS. 6 and 7. In embodiments, the active host 102 and the standby host 106 are separate hardware devices. In some embodiments, it may be possible to include the active host 102 and the standby host 106 on a single hardware device, having two or more processors. However, the active host 102 and the standby host 106 will hereinafter be described as being separate computing systems.

The active host 102 and the standby host 106 can be in communication through a network 104. The network 104 may be as described in conjunction with FIGS. 6 and 7. The network 104 may not be shown in subsequent drawings but is still provided to allow communication between the active host 102 and the standby host 106.

The active host 102 and the standby host 106 include a processor 108a and/or 108b, such as a microprocessor, to execute a virtual machine (VM) 114a and/or 114b, a main memory 110a and/or 110b, and disk storage 112a and/or 112. Main memory 110 and disk storage 112 can be any suitable form of computer readable media. Typically, disk storage 112 is one or more of a floppy disk, a flexible disk, a hard disk, a magnetic tape, or any other magnetic medium, a magneto-optical medium, a CD-ROM, any other optical medium, punch cards, paper tape, and any other physical medium with patterns of holes. In one configuration, the processor 108 and main memory 110 are collocated, while the disk storage 112 is located remotely wherefrom. Main memory 110 can also store one or more of data, executable code, states, or other information for the one or more VMs 114. Disk storage 112 can store disk writes for the one or more VMs 114. The disk writes can include one or more items of data or other information that is to be stored.

In embodiments, the active host 102 executes one or more VMs 114. A virtual machine 107 is a software implementation of a "machine" (e.g., a computing system) that executes applications or programs like a physical computing system or machine. The memory image and disk writes (which can correspond to a memory session and a "filesystem" associated with a virtual machine) for the virtual machine 107a are synchronized, mirrored, or replicated to the standby host 106 for the "back-up" or "standby" virtual machine 107b, which is not executing while virtual machine 107a is executing on the active host 102. In the event that the active host 102 fails or is no longer able to execute the virtual machine 107a, the active VM 114a "fails over" to the standby host 106, which can assume the execution of the standby VM 114b. As such, the combination of the active host 102 and standby host 106 provide high availability for the VM 114.

Another embodiment of the system 100, showing components or modules executed by the active host 102 and the standby host 106, is shown in FIG. 1B. The components or modules shown in FIG. 1B may be software modules or processes executed by a processor 108 and stored in main memory 110 of the active host 102 and the standby host 106, may be logic circuits incorporated into the hardware of the active host 102 and the standby host 106, or some combination thereof. In embodiments, the components or modules shown in FIG. 1B help maintain the high availability of the virtual machine 107. The components or modules include one or more of, but are not limited to, an infrastructure service module 116a and 116b, a virtual machine replication daemon (VMRD) 118a and 118b, a virtual machine replication engine (VMRE) 120a and 120b (which can include a checkpoint control module 122a and 122, a disk control module 124a and 124b, and a memory replication module 126a and 126b), and a distributed replicated block device (DRBD) 128a and 128b.

The infrastructure service module 116 is a daemon that can provide communication or membership services to a client. The infrastructure service module 116 allows clients to know about the presence of a process on another machine. For example, the infrastructure service module 116 on the standby host 106 would want to know about the presence of the active VM 114a on the active host 102. If the active VM 114a is not present, the standby host 106 would know to execute the standby VM 114b. An example of an infrastructure service module 116 is Heartbeat offered as open source software for Linux. The VMRD 118 and the VMs 114 may be members to which the infrastructure service module 116 determines presence or provides presence status. The infrastructure service module 116 can send a "manage" signal to the VMRD 118, which can cause the VMRD 118 to create a standby VM 114b or synchronize or update the standby VM 114b.

The VMRD 118 is a daemon process to manage the VMRE 120. To accomplish the replication, the VMRD 118 can send "control" signals to the VMRE 120, such as start/stop VMRE 120, promote/demote VMRE 120, which, in turn, activates/destroys the VM 114. Further, the VMRD 118a on the active host 102 can communicate to the VMRD 118b on the standby host 106 using a VMRD protocol. The communications, between the VMRD 118a and the VMRD 118b, help coordinate the replication of data from the active host 102 to the standby host 106 and coordinate a graceful switchover. The VMRD 118 has two different roles: "active" or "standby" depending on whether the VMRD 118 is running on the active host 102 or the standby host 106. The active VMRD 118a is capable of detecting the existence of the standby VMRD 118b. Once the communications between VMRD 118a and VMRD 118b is established, VMRD 118a can start VM protection by starting the VMRE 120a.

A VMRE 120 manages the replication of the active VM 114a to the standby VM 114b. The VMRE 120 can manage the initial replication and subsequent, periodic updates of the active VM 114a to the standby host 106. It should be noted that the active VM 114a can be a running VM. As such, the VMRE 120a can manage replication after the active VM 114a is running and without stopping the execution of the active VM 114a. The VMRE 120 may include a checkpoint control module 122, a disk control module 124, and a memory replication module 126. The checkpoint control module 122 controls the replication of the main memory 110 and the disk storage 112. Both the main memory 110 and disk storage 112 must be replicate in a manner that allows the standby host 106 to execute the VM 114. There are several processes or methods for controlling the replication.

In one technique implemented by a software system Remus™, periodic "snapshots" of the filesystem, network (session), and VM output cache in main memory 110 states of a selected active VM 114a are replicated at relatively high frequencies (e.g., every 20 to 40 milliseconds). In another technique implemented by a software system sold by Paragon Software Group™, under the tradename Snapshot™, a file system writes selected first data blocks to a computer readable medium, marking them with pointers. A snapshot is taken (e.g., of the filesystem, network, and VM output cache states of the active first, second, . . . nth virtual machines 152a-n), without any data being read, written or copied to the computer readable medium. The snapshot simply points to the current locations. As will be appreciated, other mirroring techniques may be used, such as the techniques used by Double-TakeTM, from Double-TakeTm Software.

The checkpoint control module 122 can control the actions of the memory replication module 126 and the disk control module 124. The checkpoint control module 122 can communicate through a defined CKPT control protocol to achieve synchronized memory and disk replication. As such, the checkpoint control module 122 ensures that the replication of information from the disk storage 112 and the main memory 110 is in sync. How the checkpoint control module 122 controls the replication process is explained in U.S. patent application Ser. No. 12/711,968, entitled "Method and Apparatus for High Availability (HA) Protection of a Running Virtual Machine (VM)," to Chou et al., filed Feb. 24, 2010, which is incorporated by reference in its entirety for all that it teaches.

A memory replication module 126 can replicate the data in main memory 110a to the standby host 106. In embodiments, the memory replication module 126 stores data from the main memory 110a associated with the active VM 114a to a buffer. From the buffer, the data is sent to the main memory 110b of the standby VM 114b. The memory replication module 126 may use a migration process available with XenServer, available through Citrix Systems.

Similar to the memory replication module 126, the disk control module 124 helps replicate data from one or more disks on the active host 102 to the standby host 106. The disk control module 124 may control a DRBD 128. DRBD 128 is a distributed storage system that may be similar to RAID 1, except that DRBD 128 runs over the network 104. DRBD 128 refers to both the software and also to logical block devices (e.g., the disk storage 112) managed by the software. DRBD 128 copies disk writes from the disk storage 112a to disk storage 112b.

Figure 2:
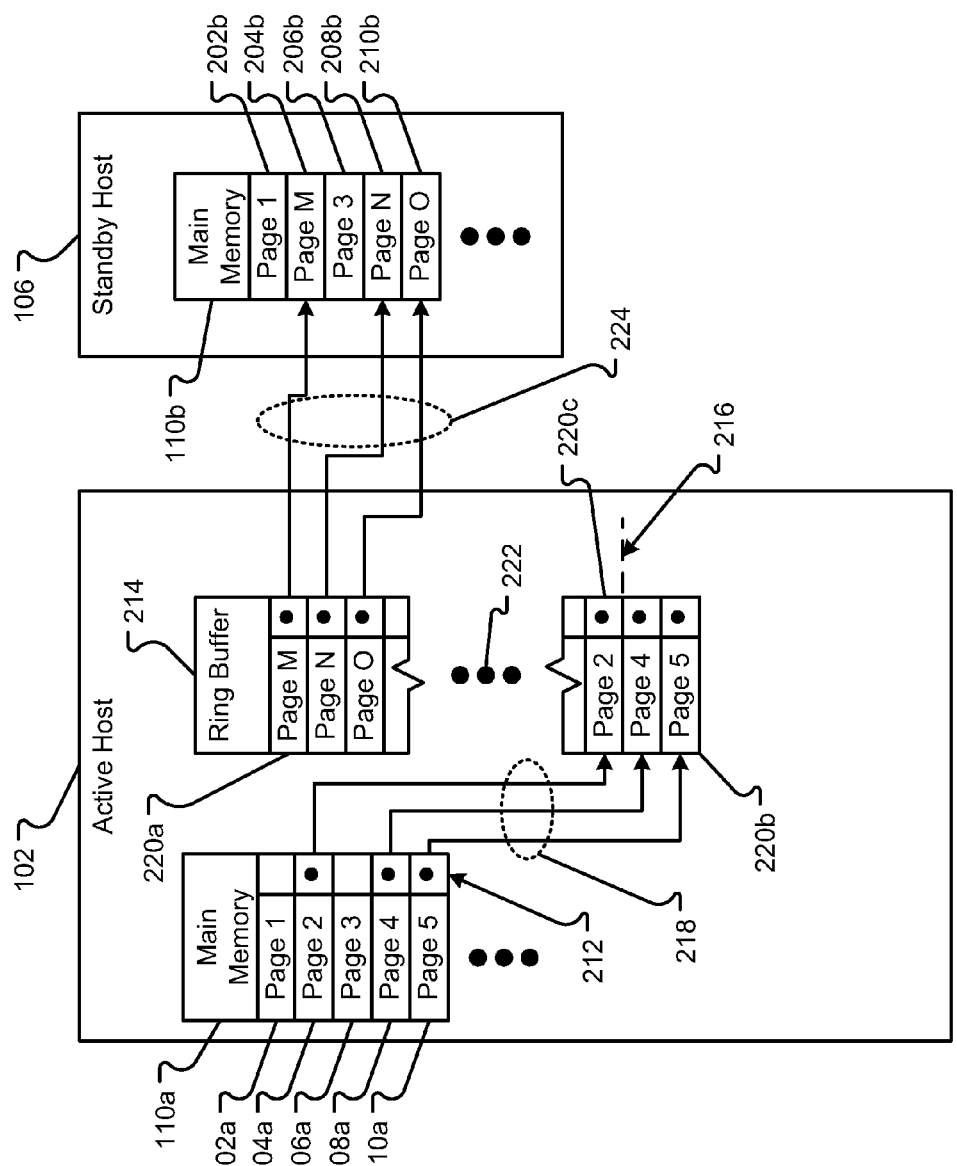
FIG. 2 is a block diagrams of embodiments of a ring buffer used to copy memory pages for an HA protected VM.

Embodiments of data structures used to copy a memory image or data, associated with an active VM 114a, from main memory 110a in the active host 102 to the main memory 110b in the standby host 106 are shown in FIG. 2. Here, the main memory 110a and the main memory 110b include one or more pages of memory 202a through 210a and 202b through 210b, respectively. During initialization of high availability, the entire memory image for the active VM 114a will be migrated to the main memory 110b of the standby host 106. However, after initialization of high availability, the active host 102 may mark particular memory pages (e.g., pages 204a, 208a, and/or 210a) dirty with a marker 212. The marker 212 may be any data element that can mark a memory page as having been changed from some moment in time. The dirty memory pages can be copied to a separate ring buffer 214. From the ring buffer 214, the active host 102 may send the dirty memory pages to the standby host 106 to store in the main memory 110b of the standby host 106.

The ring buffer 214 can have several sections that store one or more dirty memory pages. For example, the ring buffer 214 can include a first section 220a that stores a first dirty memory page. One or more sections 220 can store other dirty memory pages. The last section 220b can be the last section of the ring buffer 214 that can store memory pages. The ring buffer 214 can have more or fewer sections than those shown in FIG. 2, as represented by ellipses 222. Once the active host 102 moves a dirty memory page into the last section 220b of the ring buffer 214, the active host 102 can return to the first section 220a and store another dirty memory page in the first section 220a. As such, the ring buffer 214 can provide a buffer with almost unlimited storage as long as the dirty memory pages are sent to the standby host before the active host 102 returns to the section to store a new dirty memory page.

Thus, the ring buffer 214 can execute or communicate with two software threads. A first thread is the copy thread, which is generally shown as the group of actions 218. The copy thread 218 can copy dirty memory pages 204a, 208a, and/or 210a from the main memory 110a into the ring buffer 214. The copy thread 218 can copy dirty memory pages into subsequent sections 220 of the ring buffer 214 and return to the first section 220a when all sections of the ring buffer 214 have been used.

The second thread is a send thread generally represented by the group of actions 224. The send thread 224 can copy data from the sections 220 of the ring buffer 214 and send the data to the standby host 110b. To accommodate both the copy thread 218 and the send thread 224, the send thread 224 executes on different sections of the ring buffer 214 than the copy thread 218. In embodiments, the send thread 224 executes on sections 220 of the ring buffer 214 already used by the copy thread 218, which has already stored dirty memory pages in those sections 220a executed upon by the send thread 224. For example and as shown in FIG. 2, the copy thread 218 has already stored dirty memory pages in section 220a and the sections 220 immediately adjacent to section 220a. The copy thread 218 is now storing dirty memory pages in section 220b. Meanwhile, the send thread 224 is copying data from section 220a and the adjacent sections 220. The send thread 224 can free sections (e.g., section 220a) of the ring buffer 214 for the copy thread 218 to thereinafter use to store more dirty memory pages to the ring buffer

214. Thus, if the copy thread 218 has stored a dirty memory page in a last section 220*b* of the ring buffer 214 and still needs to store at least one other dirty memory page, the copy thread can store a next dirty memory page in the first section 220*a* of the ring buffer 214, which has been previously freed by the send thread 224.

To trigger the send thread, a threshold 216 can be created. The threshold 216, in embodiments is predetermined and can be associated with a portion of the capacity of the ring buffer. Thus, the threshold 216 can be measured by capacity or by a predetermined section 220 within the ring buffer 214. For example, the threshold 216 can be set at 50% of the capacity of the ring buffer 214. Thus, once 50% of the ring buffer 214 has been used to store the dirty memory pages, the send thread 224 is triggered to start. In a second example, the send thread 224 is triggered after section 220*c* has been used to store dirty memory page data. Either of these methods or other methods are contemplated to set the threshold 216. The threshold 216 can be set by a user. Once the threshold 216 is reached, the send thread 224 begins to execute at some other predetermined location to free sections 220 of the ring buffer 214 for future storage by the copy thread 218.

Further, the copy thread 218 may also trigger the send thread 224 when the copy thread 218 has completed copying data into the ring buffer 214. Thus, in the situation when the amount of data copied into the ring buffer 214 does not reach the threshold 216, the copy thread 218 triggers the send thread 224 to begin moving data to the standby host 106.

In embodiments, the send thread 224 is throttled. Throttling controls the rate of transfer for the send thread 224. It is possible for the send thread 224 to quickly transfer data from the ring buffer 214 to the standby host 106. The speed of the transfer may allow the send thread 224 to "catch" the copy thread. In these situations, the send thread 224 may pause and wait until either the threshold 216 is again reached or until the copy thread 218 stops execution and triggers the send thread 224. However, the speed of the send thread 224 can cause the TCP connection with the standby host 106 to become overwhelmed. Further, the notification messages between the copy thread 218 and the send thread 224 cause extra, and unwanted or unnecessary, signal traffic. Thus, the send thread 224 can be throttled, such that, the speed of data transfer of the copy thread 218 and the send thread 224 are substantially similar. In embodiments, this rate of data transfer is 4 MB per read.

Figure 3:
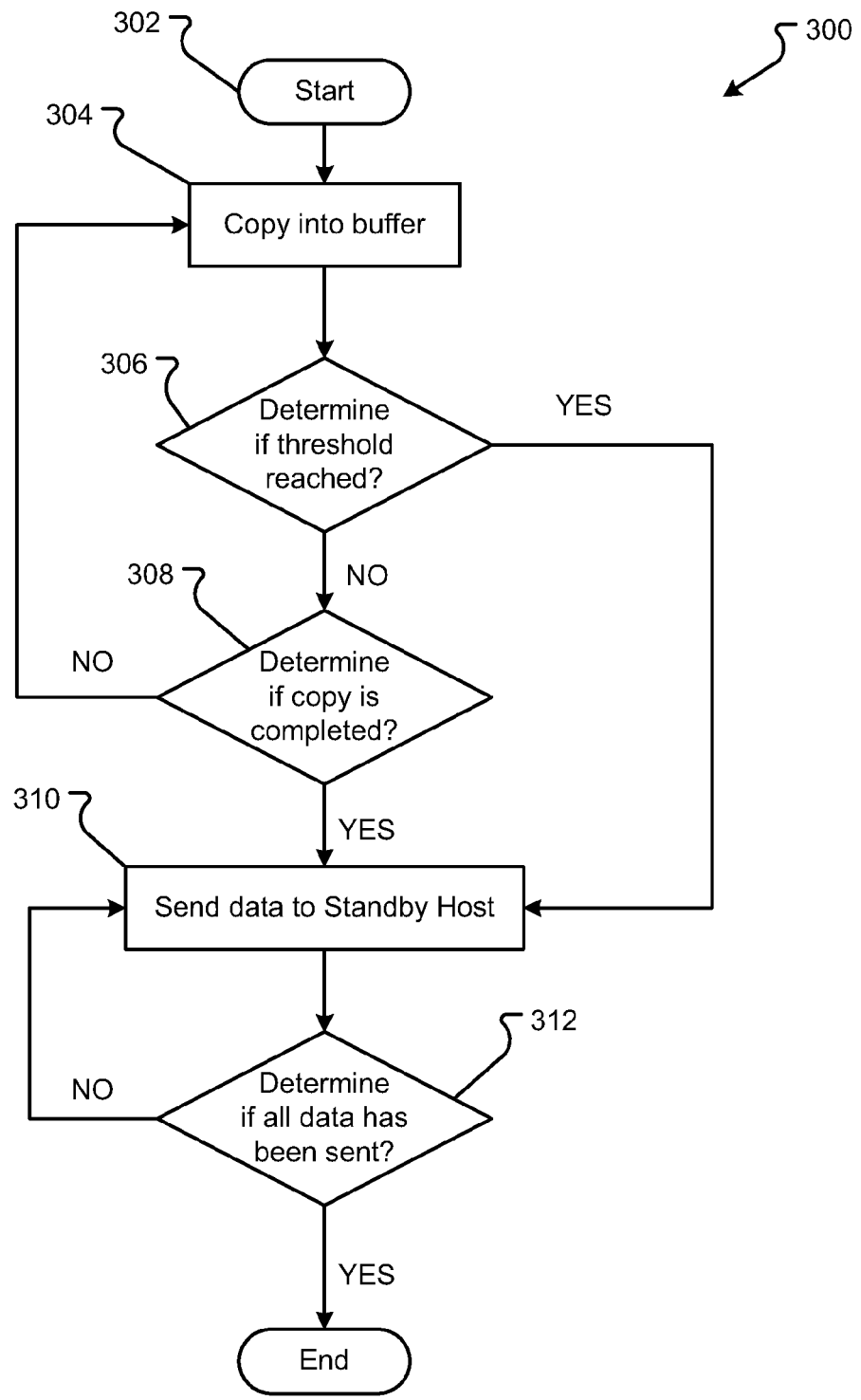
FIG. 3 is a flow diagram of an embodiment of a process for synchronizing disk storage between servers before initializing HA protection for a VM.

A method 300 for moving data through a ring buffer 214 in HA protection for a VM machine is shown in FIG. 3. Generally, the method 300 begins with a start operation 302 and terminates with an operation 312. The method 300 can represent how data is transferred during memory replication as explained in U.S. patent application Ser. No. 12/711,968, entitled "Method and Apparatus for High Availability (HA) Protection of a Running Virtual Machine (VM)," to Chou et al., filed Feb. 24, 2010, which is incorporated by reference in its entirety for all that it teaches. While a general order for the steps of the method 300 are shown in FIG. 3, the method 300 can include more or fewer steps or arrange the order of the steps differently than those shown in FIG. 3. The method 300 can be executed as a set of computer-executable instructions executed by a computer system and encoded or stored on a computer readable medium. Hereinafter, the method 300 shall be explained with reference to the systems, components, modules, software, data structures, etc. described in conjunction with FIGS. 1-2.

Upon the trigger to copy dirty memory pages as received from a checkpoint control module 122*a*, the memory replication module 126*a*, executed by the processor of the active host 102, executes a copy thread 218 that copies dirty memory pages (e.g., page 2 204*a*) into the ring buffer 214, in step 304. The dirty memory pages can be stored in a first section 220*a* of the ring buffer 214. The copying of the dirty memory pages can be as described in U.S. patent application Ser. No. 12/711, 968.

The memory replication module 126*a* can thereinafter determine if a threshold 216 has been reached, in step 306. As previously explained, the threshold 216 may be a capacity. As such, the memory replication module 126*a* can determine if the data copied into the ring buffer 214 is at some predetermined level (e.g., 50%) of the full capacity of the ring buffer 214. This determination can be done by dividing the amount of data copied into the ring buffer 214 by the known size of the ring buffer 214. This determination may be made periodically, e.g., every 15 seconds or at some pre-determined and configurable rate.

The threshold 216 may also be a certain, pre-determined section 220 of the ring buffer 214. Thus, the memory replication module 126*a* determines if that predetermined section 220 has been used to store data. In this embodiment, the memory replication module 126*a* may compare the memory address of the section 220*a* being used to store data with the memory address of the threshold 216. If the memory addresses compare, the memory replication module 126*a* recognizes that the threshold 216 has been reached. If the threshold 216 has been met, step 306 proceeds YES to step 310. If the threshold 216 is not met, step 306 proceeds NO to step 308. In other embodiments, if the threshold 216 is not met, step 306 may proceed NO back to step 302 to continuing copying data 308 and then checking the threshold 216 again at some future, pre-determined time (i.e., the copy thread 218 continues until a predetermined time period elapses upon which the threshold 216 is again checked).

The memory replication module 126*a* can then check if the copy thread 218 has completed transferring data from the main memory 110*a* to the ring buffer 214, in step 308. The memory replication module 126*a* may determine if the copy thread 218 has stopped executing. If the copy thread 218 has finished copying all dirty memory pages to the ring buffer 214, the VM resumes and the copy thread 218 stops executing. Thus, the copy thread 218 can stop executing upon completing all transfers of data from the main memory 110*a* to the ring buffer 214. The memory replication module 126*a* can periodically check if the copy thread 218 has stopped executing or may receive a signal from an operating system when the copy thread 218 stops executing. If the copy thread 218 has stopped executing, step 308 proceeds YES to step 310. If the copy thread 218 has not stopped executing, step 306 proceeds NO back to step 304.

Thus, if the copy thread 218 has stopped executing or the threshold 216 has been reached, the memory replication module 126*a* can start the send thread 224. The send thread 224 can then send data from the ring buffer 214 to the standby host 106, in step 310. Here, the send thread 224 can transfer data as described in U.S. patent application Ser. No. 12/711,968. The send thread 224 can continue until there is no data left in the ring buffer 214 to send to the standby host 106. If the send thread 224 is throttled properly, then the send thread 224 completes sending data when all the data copied from the main memory 110*a* has been transferred to the standby host 106. However, if the send thread 224 is not throttled, then the send thread 224 may need to pause at least once during the transfer of data.

Therefore, the memory replication module 126*a* can determine if all data from the main memory 110*a* that needs to be transferred to the standby host 106 has been sent, in step 312.

The memory replication module 126a may determine if the send thread 224 has emptied the ring buffer 214. In other embodiments, the memory replication module 126a may pause the send thread 224 because the send thread 224 catches the copy thread 218. After the send thread 224 resumes, the memory replication module 126a may again check whether the send thread 224 has copied all the data, which can include data stored into a section 220 of the ring buffer 214 that has data previously stored therein. If all data from the main memory 110a that needs to be transferred to the standby host 106 has been sent, step 312 proceeds YES to the end operation 314. However, if all data from the main memory 110a that needs to be transferred to the standby host 106 has not been sent, step 312 proceeds NO back to step 310 to continue sending data.

Figure 4:
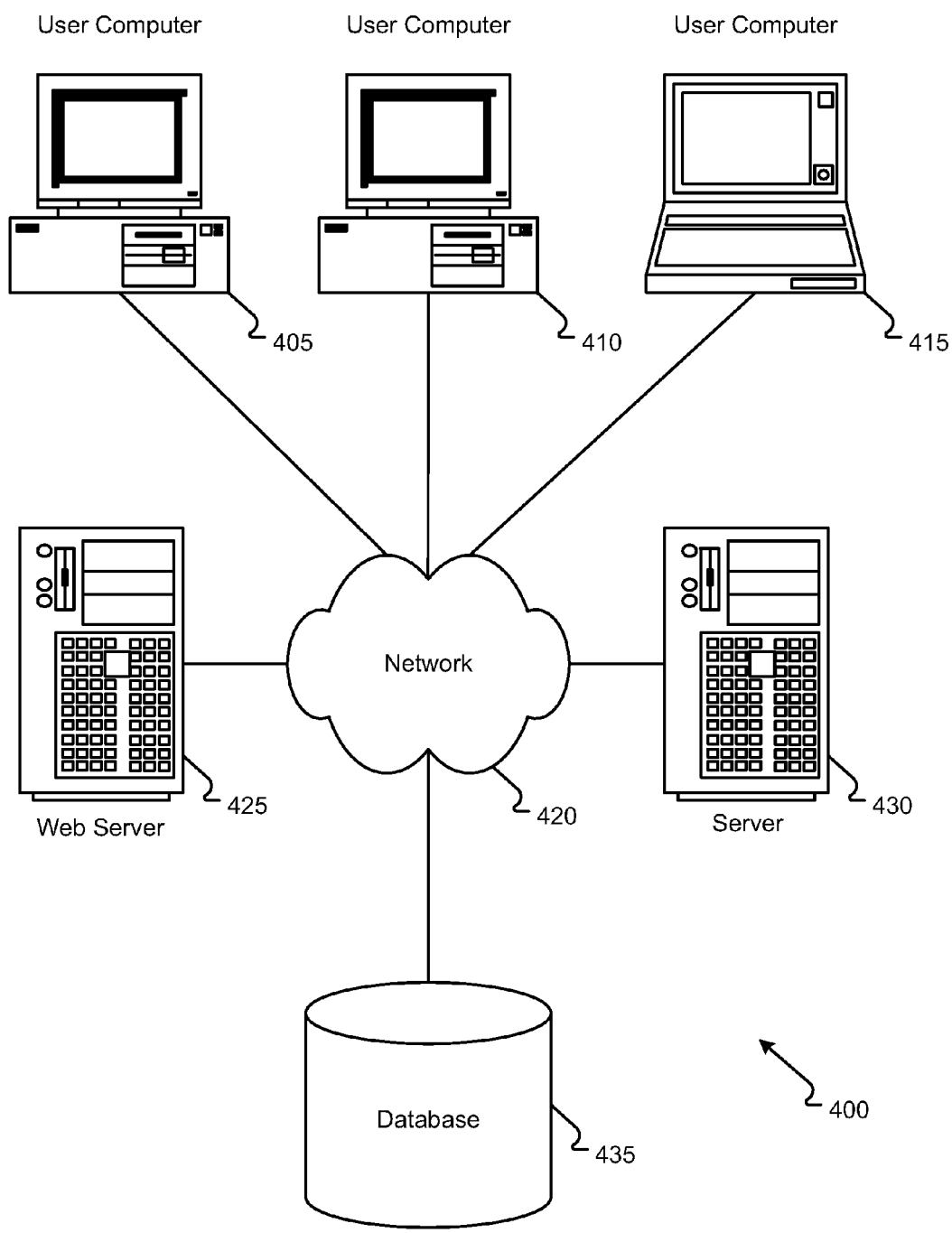
FIG. 4 is a block diagram of an embodiment of a computing environment operable to execute the HA protected VM.

FIG. 4 illustrates a block diagram of a computing environment 400 wherein the active host 102 and the standby host 104 may execute to provide HA for a VM executing on commodity hardware. As such, the system or components described in conjunction with FIG. 4 may be commodity hardware. The computing environment 400 includes one or more user computers 405, 410, and 415. The user computers 405, 410, and 415 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 405, 410, 415 may also have any of a variety of applications, including for example, database client and/or server applications, and web browser applications. Alternatively, the user computers 405, 410, and 415 may be any other electronic device, such as a thin-client computer, Internet-enabled mobile telephone, and/or personal digital assistant, capable of communicating via a network (e.g., the network 420 described below) and/or displaying and navigating web pages or other types of electronic documents. Although the exemplary computing environment 400 is shown with three user computers, any number of user computers may be supported.

Computing environment 400 further includes a network 420. The network 420 can be any type of network familiar to those skilled in the art that can support data communications using any of a variety of commercially-available protocols, including without limitation SIP, TCP/IP, SNA, IPX, AppleTalk, and the like. Merely by way of example, the network 420 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks. The network 420 may be the same or similar to network 104.

The system may also include one or more server computers 425, 430. One server may be a web server 425, which may be used to process requests for web pages or other electronic documents from user computers 405, 410, and 420. The web server can be running an operating system including any of those discussed above, as well as any commercially-available server operating systems. The web server 425 can also run a variety of server applications, including SIP servers, HTTP servers, FTP servers, CGI servers, database servers, Java servers, and the like. In some instances, the web server 425 may publish operations available operations as one or more web services.

The computing environment 400 may also include one or more file and or/application servers 430, which can, in addition to an operating system, include one or more applications accessible by a client running on one or more of the user computers 405, 410, 415. The server(s) 430 may be one or more general purpose computers capable of executing programs or scripts in response to the user computers 405, 410 and 415. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 430 may also include database servers, including without limitation those commercially available from Oracle, Microsoft, Sybase™, IBM™ and the like, which can process requests from database clients running on a user computer 405.

The web pages created by the web application server 430 may be forwarded to a user computer 405 via a web server 425. Similarly, the web server 425 may be able to receive web page requests, web services invocations, and/or input data from a user computer 405 and can forward the web page requests and/or input data to the web application server 430. In further embodiments, the server 430 may function as a file server. Although for ease of description, FIG. 4 illustrates a separate web server 425 and file/application server 430, those skilled in the art will recognize that the functions described with respect to servers 425, 430 may be performed by a single server and/or a plurality of specialized servers, depending on implementation-specific needs and parameters. The computer systems 405, 410, and 415, file server 425 and/or application server 430 may function as the active host 102 and/or the standby host 104.

The computing environment 400 may also include a database 435. The database 435 may reside in a variety of locations. By way of example, database 435 may reside on a storage medium local to (and/or resident in) one or more of the computers 405, 410, 415, 425, 430. Alternatively, it may be remote from any or all of the computers 405, 410, 415, 425, 430, and in communication (e.g., via the network 420) with one or more of these. In a particular set of embodiments, the database 435 may reside in a storage-area network ("SAN") familiar to those skilled in the art. Similarly, any necessary files for performing the functions attributed to the computers 405, 410, 415, 425, 430 may be stored locally on the respective computer and/or remotely, as appropriate. In one set of embodiments, the database 435 may be a relational database, such as Oracle 10i™, that is adapted to store, update, and retrieve data in response to SQL-formatted commands.

Figure 5:
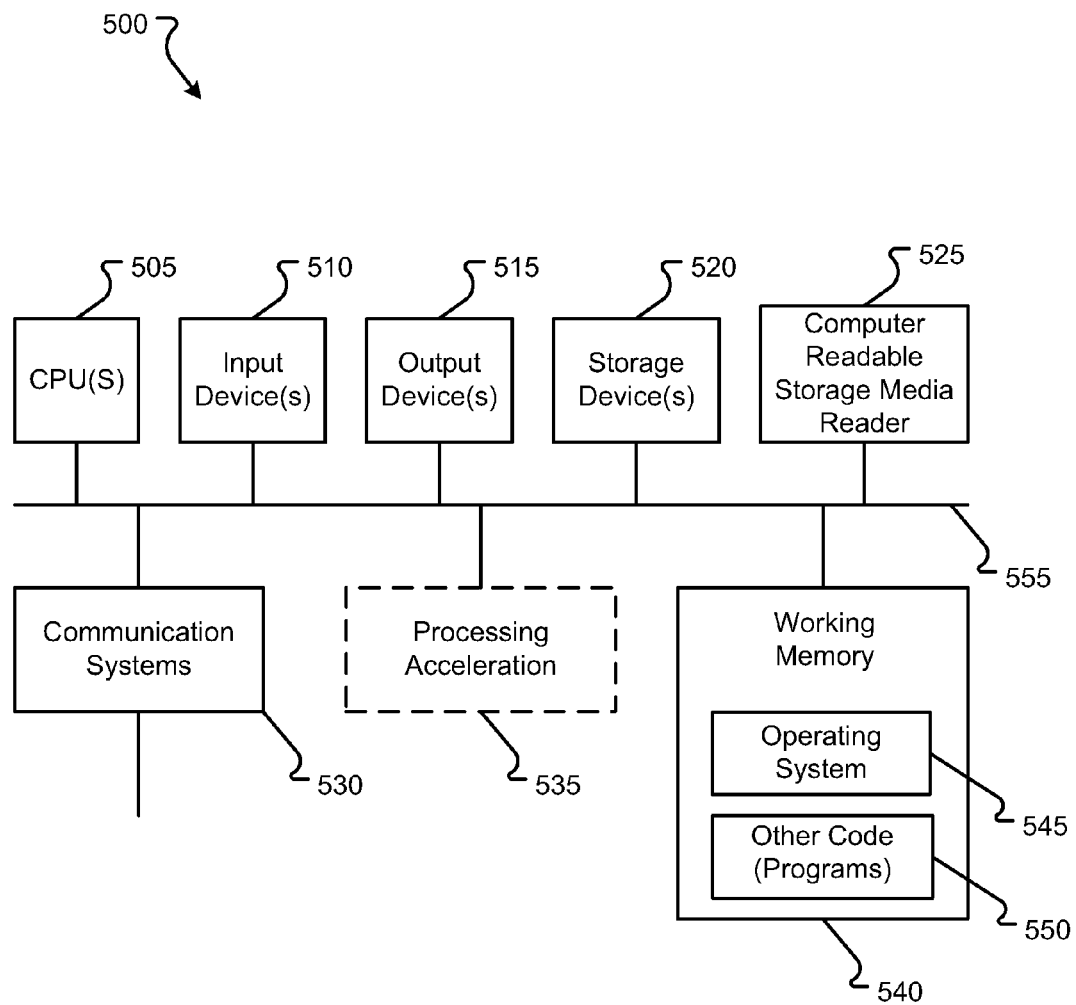
FIG. 5 is a block diagram of an embodiment of a computer operable to execute as a server that operates a VM.

FIG. 5 illustrates one embodiment of a computer system 500 upon which the active host 102, the standby host 104, or other systems or components described herein may be deployed or executed. The computer system 500 is shown comprising hardware elements that may be electrically coupled via a bus 555. The hardware elements may include one or more central processing units (CPUs) 505; one or more input devices 510 (e.g., a mouse, a keyboard, etc.); and one or more output devices 515 (e.g., a display device, a printer, etc.). The computer system 500 may also include one or more storage devices 520. By way of example, storage device(s) 520 may be disk drives, optical storage devices, solid-state storage devices such as a random access memory ("RAM")

and/or a read-only memory ("ROM"), which can be programmable, flash-updateable and/or the like.

The computer system 500 may additionally include a computer-readable storage media reader 525; a communications system 530 (e.g., a modem, a network card (wireless or wired), an infra-red communication device, etc.); and working memory 540, which may include RAM and ROM devices as described above. In some embodiments, the computer system 500 may also include a processing acceleration unit 535, which can include a DSP, a special-purpose processor, and/or the like.

The computer-readable storage media reader 525 can further be connected to a computer-readable storage medium, together (and, optionally, in combination with storage device(s) 520) comprehensively representing remote, local, fixed, and/or removable storage devices plus storage media for temporarily and/or more permanently containing computer-readable information. The communications system 530 may permit data to be exchanged with the network 420 and/or any other computer described above with respect to the computer system 500. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 500 may also comprise software elements, shown as being currently located within a working memory 540, including an operating system 545 and/or other code 550. It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments n have been described in detail herein, it is to be understood that the concepts may be otherwise variously embodied and employed, and that the appended claims are intended to be construed to include such variations, except as limited by the prior art.

What is claimed is:

1. A method for providing high availability (HA) protection to a virtual machine (VM) executing on an active host, the method comprising:
   at a checkpoint interval time, a first processor of an active host executing a copy thread;
   the copy thread copying a dirty memory page into a ring buffer;
   after the copy thread has copied the dirty memory page into the ring buffer, the first processor of the active host executing a send thread; and
   the send thread sending the dirty memory page in the ring buffer to a standby host, wherein the copy thread and the send thread execute on the ring buffer simultaneously;
   after initially synchronizing a disk image of the VM by copying the disk image of the VM from a disk storage at the active host to the standby host and while maintaining the synchronization of the disk image of the VM, the first processor synchronizing a memory image of the VM between the active host and the standby host, wherein, after memory synchronization, the memory image of the VM and the disk image of the VM are synchronized;
   once disk synchronization and memory synchronization are completed and the disk image and the memory image of the VM are synchronized, a second processor enabling a dynamic disk barrier process to be applied at a later checkpoint time interval; and
   at a checkpoint interval time after the later checkpoint time interval, the first processor and the second processor synchronizing the disk image and the memory of the VM between the active host and the standby host for all changes, wherein the standby host controls a synchronization control process at the standby host that utilizes the dynamic disk barrier to keep the memory and the disk image of the VM synchronized at the checkpoint interval for the VM on the active host and the standby host.

2. The method as defined in claim 1, wherein the copy thread copies at least one other dirty memory page into the ring buffer, and wherein the method further comprising:
the first processor determining if a threshold has been reached in the ring buffer;
if the threshold has been reached, the first processor executing the send thread.

3. The method as defined in claim 2, wherein the threshold is a portion of a total capacity of the ring buffer.

4. The method as defined in claim 3, wherein the threshold is 50% of the total capacity.

5. The method as defined in claim 2, wherein the copy thread copies the dirty memory page in a first section of the ring buffer and copies the at least one other dirty memory page into at least one subsequent section of the ring buffer.

6. The method as defined in claim 5, wherein if the threshold has been reached in the ring buffer, the send thread starts sending the dirty memory page in the first section and then the at least one other dirty memory page in the at least one subsequent section of the ring buffer.

7. The method as defined in claim 6, wherein the send thread chases the copy thread.

8. The method as defined in claim 5, wherein determining if the threshold has been reached in the ring buffer is based on storing the dirty memory page in one of the subsequent sections of the ring buffer.

9. The method as defined in claim 1, wherein the send thread is throttled to process data at a speed similar to the copy thread.

10. The method as defined in claim 9, wherein the send thread is throttled to 4 MB per read.

11. A non-transitory computer readable medium having stored thereon instructions that cause a computing system to execute a method for providing high availability (HA) protection to a running virtual machine (VM) executing on an active host, the instructions comprising:
instructions to determine if a checkpoint has arrived during an HA process;
if a checkpoint has arrived, instructions to suspend operation of the VM;
instructions to execute a copy thread that copies two or more dirty memory pages to a ring buffer at the active host;
instructions to determine if a threshold has been reached in the ring buffer, wherein the threshold is associated with data availability in the ring buffer;
instructions to determine if the copy thread has stopped executing; and
if the threshold has been reached or the copy thread has stopped executing, instructions to execute a send thread that sends the two or more dirty memory ages to a standby host, wherein the copy thread and the send thread execute on the ring buffer simultaneously;
after initially synchronizing a disk image of the VM by copying the disk image of the VM from a disk storage at the active host to the standby host and while maintaining the synchronization of the disk image of the VM, instructions to synchronize a memory image of the VM between the active host and the standby host, wherein, after memory synchronization, the memory image of the VM and the disk image of the VM are synchronized;
once disk synchronization and memory synchronization are completed and the disk image and the memory image of the VM are synchronized, instructions to enable a dynamic disk barrier process to be applied at a later checkpoint time interval; an
at a checkpoint interval time after the later checkpoint time interval, instructions to synchronize the disk image and the memory of the VM between the active host and the standby host for all changes, wherein the standby host controls a synchronization control process at the standby host that utilizes the dynamic disk barrier to keep the memory and the disk image of the VM synchronized at the checkpoint interval for the VM on the active host and the standby host.

12. The computer readable medium as defined in claim 11, further comprising if the copy thread has stopped executing, instructions to resume the VM.

13. The computer readable medium as defined in claim 11, wherein the send thread frees at least one section of the ring buffer for the copy thread to store a dirty memory page.

14. The computer readable medium as defined in claim 13, wherein if the copy thread has stored a dirty memory page in a last section of the ring buffer and still needs to store at least one other dirty memory page, further comprising the copy thread storing a next dirty memory page in a first section of the ring buffer freed by the send thread.

15. A server computing system comprising: an active host, the active host comprising:
a main memory operable to store a memory image associated with a virtual machine (VM);
a ring buffer operable to store one or more dirty memory pages from the main memory;
a first processor in communication with the main memory and the ring buffer, the first processor executing the VM, the first processor operable to execute a memory replication module, the memory replication module operable to:
execute a copy thread that copies two or more dirty memory pages to the ring buffer;
determine if a threshold has been reached in the ring buffer, wherein the threshold is associated with a portion of a capacity of the ring buffer; and
if the threshold has been reached, instructions to execute a send thread that sends the two or more dirty memory ages to a standby host, wherein: the send thread chases the copy thread;
the send thread and executes simultaneously as the copy thread; and
the send thread executes on a different section of the ring buffer than the copy thread;
after initially synchronizing a disk image of the VM by copying the disk image of the VM from a disk storage at the active host to the standby host and while maintaining the synchronization of the disk image of the VM, synchronize a memory image of the VM between the active host and the standby host, wherein, after memory synchronization, the memory image of the VM and disk image of the VM are synchronized;
a second processor operable to:
once disk synchronization and memory synchronization are completed and the disk image and the memory image of the VM are synchronized, enable a dynamic disk barrier process to be applied at a checkpoint time interval; and
the first and second processors operable to:
at a checkpoint interval time thereinafter, synchronize the disk image and the memory of the VM between the active host and the standby host for all changes, wherein the standby host controls a synchronization control process at the standby host that utilizes the dynamic disk barrier to keep the memory and disk image of the VM synchronized at the checkpoint interval for the VM on the active host and the standby host.

16. The server computing system as defined in claim 15, further comprising:

the standby host, the standby host comprising:

a main memory, the main memory operable to store a memory image associated with a virtual machine (VM), wherein the main memory receives the dirty memory pages from the send thread.

17. The server computing system as defined in claim 15, wherein after the copy thread has stored dirty memory page data into a last section of the ring buffer, the copy thread is operable to return to a first section of the ring buffer to store a next dirty memory page data.

18. The server computing system as defined in claim 17, wherein the send thread had previously freed the first section of the ring buffer for the copy thread.

19. The server computing system as defined in claim 15, wherein after the copy thread has copied a last dirty memory page to the ring buffer, the VM resumes executing and the send thread continues to send dirty memory page data to a standby host until all dirty memory page data has been sent.

* * * * *